United States Patent
Desrosiers

(10) Patent No.: US 7,973,665 B2
(45) Date of Patent: Jul. 5, 2011

(54) CHILD MONITOR SYSTEM WITH CONTENT DATA STORAGE

(75) Inventor: Craig Desrosiers, Spring City, PA (US)

(73) Assignee: Graco Children's Products Inc., Exton, CA (US)

( * ) Notice: Subject to any disclaimer, the term of this patent is extended or adjusted under 35 U.S.C. 154(b) by 278 days.

(21) Appl. No.: 12/262,636

(22) Filed: Oct. 31, 2008

(65) Prior Publication Data

US 2010/0109878 A1    May 6, 2010

(51) Int. Cl.
*G08B 23/00* (2006.01)
*G08B 1/08* (2006.01)
*H04N 7/18* (2006.01)

(52) U.S. Cl. ........... 340/573.1; 340/539.15; 340/539.25; 348/14.03; 348/143

(58) Field of Classification Search ................ 340/573.1, 340/539.15
See application file for complete search history.

(56) References Cited

U.S. PATENT DOCUMENTS

| | | | |
|---|---|---|---|
| 2004/0132489 A1* | 7/2004 | Ryley et al. | 455/556.1 |
| 2006/0197671 A1* | 9/2006 | Groover | 340/573.1 |
| 2007/0156060 A1* | 7/2007 | Cervantes | 600/534 |

OTHER PUBLICATIONS

Owner's Manual, Graco imonitor digital color video baby monitor, pp. 1-32 (Mar. 2008).
Quick Start Product Instruction Manual, Graco Model No. 2797VIB3, one page (Mar. 2008).

* cited by examiner

*Primary Examiner* — Donnie L Crosland
(74) *Attorney, Agent, or Firm* — Lempia Summerfield Katz LLC

(57) ABSTRACT

A child monitor system includes a child unit having a sensor to capture content, and a parent unit having a processor and a user interface communicatively coupled with the processor to reproduce the content captured by the sensor. The child unit and the parent unit are configured to communicate via a wireless communication link carrying content data representative of the captured content. The system further includes a memory communicatively coupled with the child unit or the parent unit and configured for non-volatile storage of the content data. The processor of the parent unit is configured to issue an instruction to effectuate the non-volatile storage of the content data in the memory in response to a content storage request received via the user interface.

15 Claims, 4 Drawing Sheets

CHILD MONITOR SYSTEM WITH CONTENT DATA STORAGE

BACKGROUND OF THE DISCLOSURE

1. Field of the Disclosure

The present disclosure is generally directed to child monitors, and more particularly to child monitors with video or other image capture functionality.

2. Description of Related Art

Conventional child monitor systems typically have a receiver (or parent unit) and a transmitter (or child unit) that communicate wirelessly with one another. The child unit is typically placed in the nursery or other environment occupied by the child, and the receiver is typically located remotely from the child's environment in a room or location occupied by a caregiver. From there, the child unit captures sounds and, in some cases, images, and transmits representative data to the parent unit, at which point the data is converted back into the sounds and images for playback. In this way, the caregiver can use the system to periodically check to see if the child is sleeping peacefully or otherwise safely disposed within the nursery.

Some parent units have been designed for portability, enabling the unit to be carried or worn by the caregiver. As a result, the caregiver can continue to monitor the child in the nursery while engaged in other activities. A vibration alert feature is also provided in some commercially available systems, as the caregiver may at times be unable to hear the reproduced sounds or watch the displayed images.

The digital communication links established in several commercially available systems have been capable of transmitting information in addition to the audio and video data. For example, the imonitor™ monitor products available from Graco Children's Products as models nos. 2791 and 2795 transmit an identification, or privacy, code to the receiver during a startup routine. The transmitters can also send a command to the receiver to activate a parent unit finder feature.

Unfortunately, the digital transmissions of commercially available systems have typically been capable of producing only relatively low quality audio and image content. Transmission conditions and other factors can introduce noise, limit reception strength, and cause dropouts or interruptions. These and other real-world factors have generally discouraged the transmission of high resolution images and other data-intensive content. Nevertheless, the resulting quality is often tolerable or sufficient considering the size of the display screen of a typical parent unit, as well as the often limited or intermittent use of the display. Thus, the video feed may still be acceptable for purposes of determining whether the child is awake, sleeping, restless or content.

BRIEF DESCRIPTION OF THE DRAWINGS

Objects, features, and advantages of the present invention will become apparent upon reading the following description in conjunction with the drawing figures, in which.

DETAILED DESCRIPTION OF THE DISCLOSURE

Figure 1:
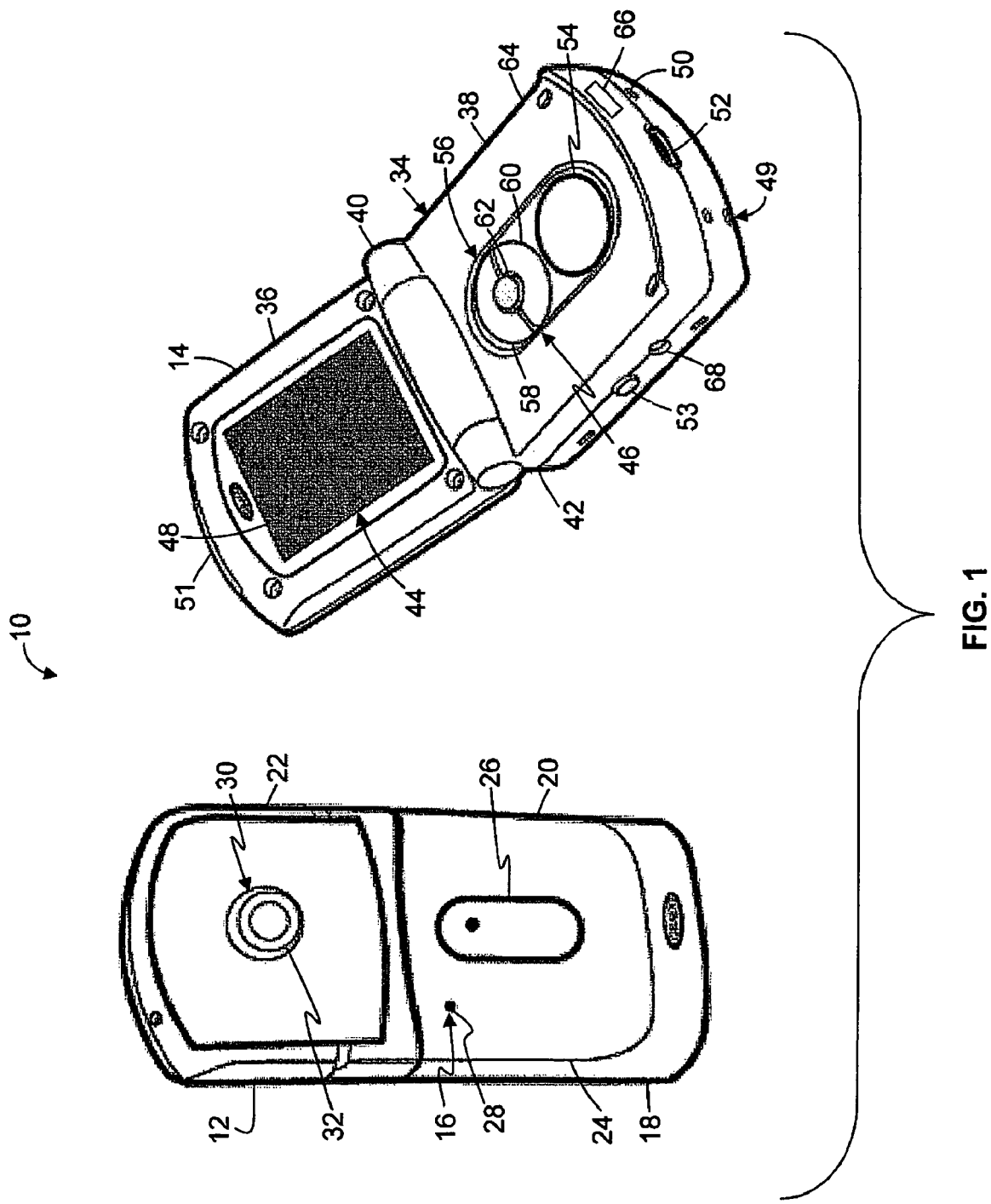
FIG. 1 shows a perspective view of one example of a child monitor system having child and parent units suitable for use with one or more aspects of the disclosure involving remote storage of content captured by the child unit.

The disclosure is generally directed to child monitor systems in which content data is stored so that captured content can be recorded for later enjoyment, distribution, and other uses. In some cases, the content data is stored in response to a remote request for storage of the captured content made from a parent unit. Issuing an instruction to store the content data remotely allows a caregiver to assess whether the content should be recorded without disturbing or distracting the child. The devices and systems described herein generally support and provide such remote content capture and data storage, as well as the subsequent distribution, viewing, sharing, and other uses. In these ways, the caregiver can monitor the candid and uninfluenced content reproduced from a real-time data stream or feed, and at any time initiate data storage of a selected portion of the corresponding content data.

Some aspects of the disclosure are directed to overcoming challenges introduced by the portable nature of the parent unit used to monitor the content. At the outset, a portable parent unit is more convenient than stationary monitors associated with webcam-based or other remotely controlled video camera systems. The caregiver avoids being inconveniently tied to the location of a computer or other terminal. However, the maintenance of the wireless communication link can be complicated by the repositioning of the parent unit. Thus, some embodiments described below may adjust operational parameters or transmission characteristics to accommodate the varying, wireless nature of the communication link, while still supporting the transmission of the content data to be stored. In these ways, the content is recorded at a quality level (e.g., resolution) appropriate for reproduction via devices other than the small display of the parent unit.

Some aspects of the disclosure are directed to facilitating the capture of content that is fleeting or difficult to anticipate or predict. For instance, some embodiments may utilize a buffer configured to store the content data in a continuous manner. A user request to store recently displayed content then relies on the storage capacity of the buffer to store data representative of past content, as further described below.

Some aspects of the disclosure are directed to addressing the challenges of supporting continuous, real-time, wireless broadcasts of the captured content in connection with the monitoring function, while recording on-demand high-quality images or other content for subsequent enjoyment. In past systems, the quality of the content as displayed on the parent unit can be inadequate or otherwise undesirable when not viewed in real-time. Using the devices, systems and techniques disclosed herein, caregivers can use the real-time broadcast to assess the content, and then select a portion thereof for storage at a high resolution or quality level.

Although described in connection with exemplary child monitor systems involving the capture of audio or image data for a caregiver, the disclosed techniques, devices and systems are well suited for implementation and use in a variety of contexts and applications. Practice of the disclosed techniques, devices and systems is accordingly not limited to a particular child monitoring context or application. For instance, although described in connection with portable parent units, several aspects of the disclosure are equally applicable to non-portable units. The systems are also not limited to video monitors or monitors having cameras, and are instead well suited for any type of content or content sensor, including those systems that may be user-configurable or otherwise switch between content types or combinations thereof.

Turning now to the drawing figures, FIG. 1 depicts an exemplary child monitor system indicated generally at 10 in which at least two devices (or units) are configured for wireless communication. A child unit 12 of the system 10 may be Located in a nursery (or other child location) to transmit audial or visual content (e.g., sound, still images, or video images) via a wireless communication link with a parent unit 14 located remotely from the child. To that end, the child unit 12 captures sound via a microphone transducer or sensor 16, and then transmits an RF or other wireless signal carrying data indicative of the captured sound. The digital transmission may use any desired modulation or other communication protocol. The parent unit 14 is generally configured to gather the transmitted signal to extract the data and reproduce the content. The parent unit 14 may be a handheld, portable, wearable, or otherwise mobile unit.

The system 10 may include one or more child units 12 or one or more parent units 14, and a number of system accessories (not shown). More generally, the term "parent unit" is used herein as a general, shorthand way to reference the device (or devices) carried or used by, or associated with, a caregiver or other person monitoring the child via the disclosed system 10. The term "child unit" is similarly used herein as a general, shorthand way to reference the device (or devices) positioned to capture content reflective of the child's condition, activities, etc. As a result, the parent and child units may, in fact, refer to an assembly, collection or group of devices or components that may be integrated to any desired extent. For example, the terms are used herein with the understanding that they may encompass or include one or more associated items, such as power adapters, docking stations, rechargeable battery packs, belt clips, mounting brackets, data cables, etc., coupled to the units 12, 14 as shown in FIG. 1. These aspects and components of the child and parent units 12, 14 may vary considerably, as desired. Further details regarding exemplary arrangements suitable for use with the aspects of the disclosure described below are set forth in co-pending and commonly assigned U.S. application Ser. No. 11/697,266, entitled "Video Baby Monitor Systems with Battery Back-up" and filed on Apr. 5, 2007, the entire disclosure of which is hereby incorporated by reference.

As shown in FIG. 1, the child unit 10 generally has an exterior housing 18 with a lower portion 20 and an upper portion 22 coupled to and positioned on top of the lower portion 20. The child unit 10 in this example has a front surface 24 with a power or ON/OFF button 26 positioned generally centrally in the front surface 24 in the lower portion 20. The front surface 24 also includes a microphone opening 28 behind which the microphone 16 may be disposed. Generally speaking, the opening 28 allows the microphone 16 to capture sounds occurring within the vicinity of the child unit 12. The upper portion 22 includes an image sensor or camera 30 generally disposed within the upper portion 22 of the housing 18. The camera 30 includes a camera lens 32 disposed in an opening in the front surface 24 in the upper portion 22. The camera 30 may also include additional components disposed on or along the exterior housing 18, such as an infrared light emitter (not shown) to support the capturing of images in low ambient light, and an ambient light detector or sensor (not shown) to determine when the ambient light reaches a threshold. These and other structural characteristics of the child unit 10 may vary considerably from the example shown, as desired.

Several aspects of the camera 30 may be adjustable to configure the child unit 12 for a particular operational setting. In some cases, the upper portion 22 of the housing 18 is movable relative to the lower portion 20. For example, the upper portion 22 can be rotated or swiveled relative to the lower portion 20, or can be pivoted forward or rearward relative to the lower portion 20. In these ways, the camera 30 can be positioned or directed to an intended target location. The camera lens 32 may be movable to, for example, adjust a desired zoom or magnification level. The orientation or positioning of the camera 30 may be adjustable relative to the front surface 24 or the housing 18 so that the camera lens 32 can be aimed or directed to an intended target location.

The parent unit 14 in this example has a two-part housing assembly 34 with a flip or upper section 36 and a base or lower section 38. A hinge or joint 40 is positioned along mating edges of the sections 36 and 38. The foot section 36 can be rotated or pivoted relative to the base section 38 to an open position, as shown, and to a closed position (not shown). While the parent unit 14 may be used to monitor the child environment in both the open and closed positions, the closed position may be more well-suited for portable use (e.g., while carried on a belt or in a pocket). An antenna (not shown) may be disposed within the housing 34, or extend from the housing 34 in, for example, and upward direction from an upper edge 42 of the base section 38.

In this example, a user interface of the parent unit 14 generally includes an output or display interface 44 and an input or keypad interface 46. The output interface 44 is generally directed to visually displaying information to the caregiver, but may include components or aspects directed to providing output information of a non-visual nature. The input interface 46 is generally directed to accepting or capturing touch-based commands or directions from the caregiver, but may include components or aspects directed to capturing input information of a non-touch nature. In this example, the output interface 44 and the input interface 46 are generally disposed on, and arranged within, the flip and base sections 36 and 38 of the housing 34, respectively. More generally, the input and output functions and aspects of the user interface of the parent unit 14 may be distributed in any desired manner across the housing 34, and may be integrated to any desired extent.

The output interface 44 includes a display screen 48 that covers or extends substantially over a front, viewing surface of the flip section 36 exposed when the housing 36 is disposed in the open position. The display screen 48 may include or involve any desired display or display screen technology. In some cases, the display screen 48 is a liquid crystal display (LCD). Alternatively or additionally, the output interface 44 includes multiple display screens or other display elements peripherally associated with the display screen 48.

The output interface 44 further includes any number of lights, lamps, or other illumination devices as visual indicators of status or other information. The visual indicators may, but need not, be light emitting diodes (LEDs). In this example, the output interface 44 includes a battery level indicator light 49, a battery charging status indicator light 50, and a set of indicator lights 51 that may provide a wireless connection status indication and an array of soundlights (e.g., a soundlight bar). The soundlights generally provide a visual indication of the sounds captured by the child unit 12 and, thus, may vary in intensity, color, progressive illumination, and other ways to characterize or reflect the captured sounds. Similarly, the visual indicator lights 49 and 50 may be configured for varying illumination colors or intensity, progressive illumination, and the like to vary the information or message conveyed thereby. The output interface 44 also includes one or more speakers 52 to provide audio output of the reproduction of the captured sounds. The speaker 52 may be configured in a variety of ways and may include or involve an opening in the housing 34 disposed in proximity to a diaphragm or other speaker element (not shown).

The input interface 46 generally includes a number of keypad or button elements that may be actuated by the caregiver to initiate various functions or actions. In this example, the input interface 46 includes a power ON/OFF button 53 turn the parent unit 14 on or off, and a video ON/OFF button 54 to turn the display screen 48 on and off without powering down the remainder of the parent unit 14. The input interface 46 further includes a control keypad 56 having a set of navigational and other control buttons directed to controlling a cursor or other user interface element displayed via the screen 48. In this example, the control pad 56 includes UP and DOWN buttons 58, 60 to toggle or cycle through lists and other arrangements of options, as well as an "OK" or selection button 62 for use to pursue or select the current (e.g., highlighted) option. The input interface 46 of this example may also include a set of buttons (not shown) directed to volume control for the audio reproduction by the speaker 52 (e.g., up, down, and mute). The volume control buttons may be disposed on a side face 64 of the housing 34. The location, size, orientation, shape, actuation, functionality, and other characteristics of these elements of the input interface 46 may vary considerably from those shown, as desired.

The user interface of the parent unit 14 also includes a number of input/output ports that provide interfaces or connectivity functionality in connection with coupling the parent unit 14 to other devices, components, or elements. More specifically, the connectivity ports may be configured in accordance with any desired communication or protocol standard, such as the Universal Serial Bus (USB) standard. Alternatively or additionally, the ports may be configured as an application-specific or proprietary connectivity link, such as a custom, pin-based connection to a docking station (not shown). In this example, a USB port 66 is provided to enable data transfers to or from the parent unit 14 in connection with communications with another computing device (not shown), as described further below. The ports of the parent unit 14 also include an AC power input socket or jack 68 to support a connection to an AC adapter. In this way, AC power may be provided as an operational alternative or option to battery power, which, in turn, may be provided via any desired type of battery arrangement disposed within a battery compartment accessed via a door (not shown) in a rear face of the base section 38.

The foregoing structural and other aspects of the parent unit 14 may vary considerably from the example shown. For example, the number, location, integration, size, shape, and other characteristics of the elements of the output and input interfaces 44, 46 need not follow the configuration of the example. One or more aspects or components of the output and input interfaces 44, 46 may also be integrated via the display screen 48. In this way, the display screen 48 may also form part of the input interface 46 because a number of the operational parameters or settings for the parent unit 14 (and, more generally, the system 10) may be established via the menus, panes, and other display elements provided via the screen 48 and accessed using the navigational and other user control or select buttons. The parameters or settings made available via the display screen 48 may vary considerably, and are not limited to the functions and operations described above in connection with the exemplary user interface shown in FIG. 1. Instead, the available parameters or settings may present a wide variety of functions and options to the caregiver, including those examples described or identified in the above-referenced application Ser. No. 11/697,266.

Figure 2:
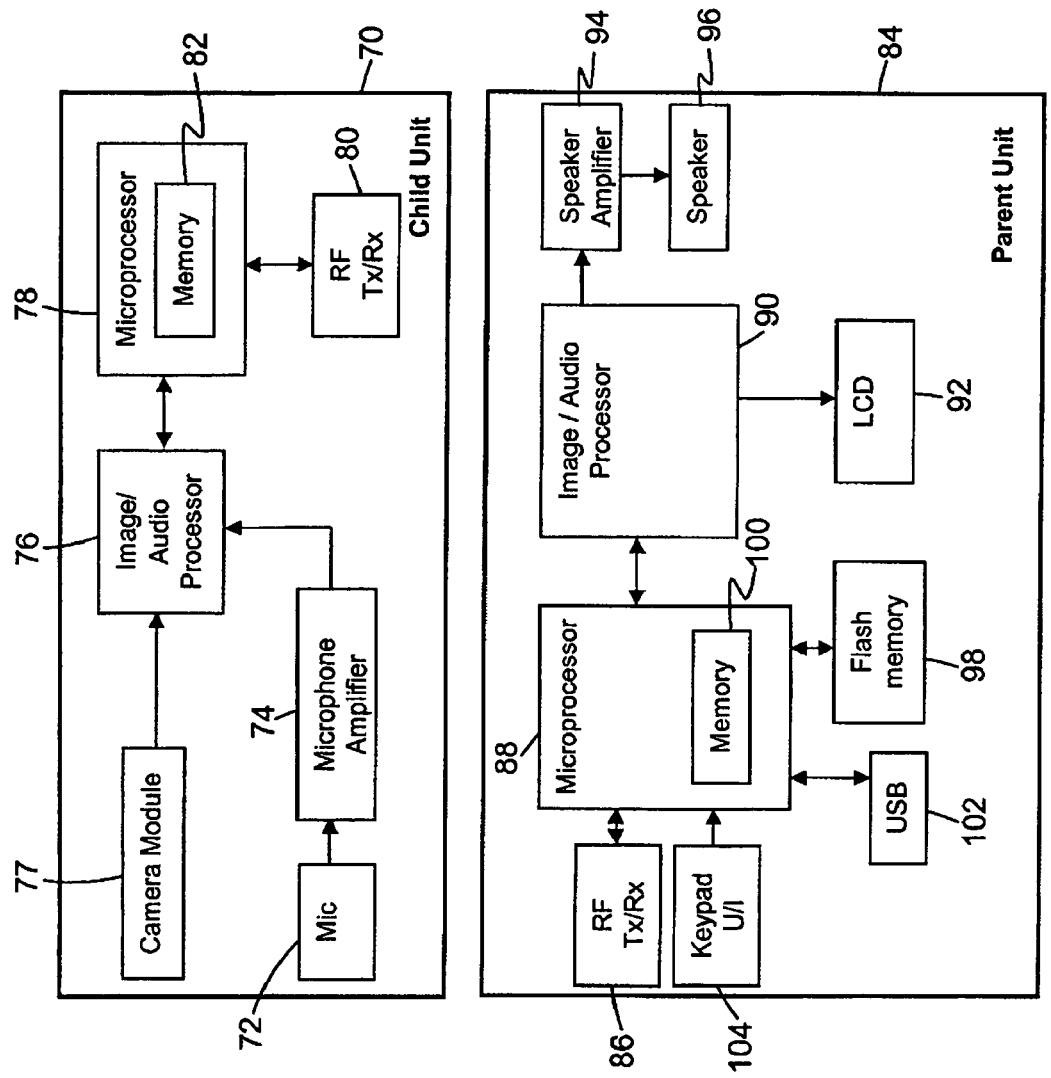
FIG. 2 is a schematic block diagram of an exemplary child monitor system having a parent unit configured to store content in accordance with several aspects of the disclosure.

With reference now to FIG. 2, an exemplary child unit 70 includes a number of analog and digital component devices, including one or more content sensors to capture audial, visual, and other content, and then generate digital data representations thereof for transmission. The sounds encountered in the nursery or other monitoring location are converted to an analog signal with a microphone transducer or sensor 72, which is then amplified with a microphone amplifier 74. In some cases, the analog signal may then be converted to digital data by a separate (e.g., discrete) analog-to-digital converter (not shown). In this example, the analog representation of the captured sounds is provided to an image/audio processor 76 that has an integrated analog-to-digital converter.

The image/audio processor 76 also receives a digital data stream representative of one or more images captured by a camera module 77. The camera module 77 is generally configured to capture one or more still images in the nursery or other monitoring site. Each image of the environment at the monitoring site may be arranged in a data set provided by an image sensor array (not shown) of the camera module 77. The camera module 77 may include one or more lenses and other optical components, image sensor arrays, and other components directed to attaining a desired or selected resolution, image capture rate, etc. The image capture rate may vary considerably, e.g., from photographs taken every few seconds to rates suitable for sequences of video frames. As described below, the images can be taken at selected times or at any desired repetition or video frame rate. Thus, the terms "image" and "visual content" may be used herein to refer to either still images, video imagery, or any combination thereof. The camera module 77 may further include one or more processors or processing elements to perform image processing tasks (e.g., white balance, filtering, etc.) and handle communications with the image/audio processor 76 or a microprocessor 78. In some cases, the communications with the image/audio processor 76 or the microprocessor 78 may be minimal or limited to basic operations (e.g., shutdown, wake-up, etc.) or may involve configuration settings or operational commands for the camera module 77, as described further below. In yet another example, the camera module 77 only includes minimal processing functionality, and is instead configured to provide bitmap data representative of the captured content rather than any compressed version thereof.

In this example, the image/audio processor 76 is configured to perform a number of processing operations in addition to preparing digital representations of the audial or visual content. In the example shown in FIG. 2, the image/audio processor 76 is a multimedia (e.g., image and audio) processor that handles both the audio and image data to generate an integrated data set or stream for transmission. The microprocessor 78 may then package the output of the image/audio processor 76 into data packets suitable for transmission. For example, the microprocessor 78 may configure the data packets to include a variety of other information in addition to the content data, including identification headers, synchronization data, error detection, commands, and other information. These and other tasks may be handled by any number or configuration of processors or processing elements. For example, the image and audio processing functions may be handled separately by multiple, discrete components. In other cases, a single microprocessor handles the tasks implemented by the image/audio processor 76 and the microprocessor 78 of the example shown.

Using the microprocessor 78 and/or the image/audio processor 76, a digital data stream is eventually generated for incorporation into a wireless signal. To that end, the digital data stream is provided to a digital RF transceiver 80 that encodes or modulates a carrier signal. For example, a transmitter subsystem (not shown) of the RF transceiver 80 may modulate an RF carrier signal (e.g., 900 MHz or 2.4 GHz) with the packets of the digital data stream provided by the microprocessor 78. Any conventional modulation or encoding scheme may be utilized. The RF transceiver 80 then provides the modulated carrier signal to an antenna or other apparatus (not shown) coupled thereto and configured for propagation of the RF signal as a wireless signal.

The processing provided by the image/audio processor 76 may involve or implement one or more coding protocols or techniques to support the digital transmission and downstream processing of the content data. For example, the data from the camera module 77 may be in a raw or other preliminary format, and the image/audio processor 76 may implement one or more compression, compilation, filtering, packet organization, or other procedures to organize or present the raw data in a more refined or convenient format. The procedures may correspond with data conversions and other techniques established by, and in accordance with, one or more media data standards or protocols. To those ends, the image/audio processor 76 may be programmed or otherwise configured to implement any number of sets of codec instructions stored in the form of software, firmware, hardware, or any combination thereof. For example, still image data may be processed in accordance with the JPEG standard, and video data may be processed in accordance with MPEG or H.264. In some cases, the image/audio processor 76 includes more than one processor (or processing element) integrated within a system-on-a-chip architecture with embedded memory and other integrated components. As a result, the processors (or processing elements) may be dedicated or directed to handling respective content data types (e.g., audio and image) or different task types. For example, the image/audio processor 76 may include a dedicated media processor or component thereof (e.g., firmware) configured in accordance with each applied coding protocol or standard. Notwithstanding the foregoing, the techniques implemented by the image/audio processor 76 may integrate the audio and image data to any desired extent.

A variety of different commercially available integrated circuits may be used as the image/audio processor 76, including, for example, the programmable multimedia processors from STMicroelectronics Corp (www.st.com), and the audio/video chip having a multimedia processor available from Winbond Electronics Corp. (www.winbond.com) as product no. W99702G. These chips may be configured to include any number of codecs for audio and image processing in accordance with conventional data protocols (e.g., MPEG).

The microprocessor 78 in the example shown in FIG. 2 may include a general-purpose processor directed to controlling the various operations and functions of the child unit 70. For example, the microprocessor 78 may be programmed to implement tasks related to preparing a digital data stream for RF transmission. To that end, the microprocessor 78 may implement one or more routines directed to arranging the content data prepared by the image/audio processor 76 into data packets or frames suitable for RF transmission. The microprocessor 78 may also be configured to implement one or more tasks or routines related to controlling the camera module 77. As described further below, one aspect of the disclosure involves or includes the manner in which the camera module 77 is selectively controlled by the caregiver in accordance with instructions sent to the child unit 70. More generally, the instructions may include commands to capture content via the camera module 77 or the microphone 72, to store captured content, and to otherwise process captured content. To these ends, the microprocessor 78 may have a memory 82 in which instructions or content data is stored. The memory 82 need not be fully contained within the microprocessor package as shown in the example of FIG. 2, and may be of any desired size, type, location, number, etc. For example, the memory 82 may be volatile SDRAM or SRAM, non-volatile flash memory, or a user-removable flash memory card.

In some cases, the tasks handled by the image/audio processor 76 may be shared with, or implemented by the microprocessor 78, instead. More specifically, the microprocessor 78 may be configured to prepare a digital representation(s) of the captured content in addition to implementing any one or more coding and conversion techniques to support the digital transmission of the content data. In these cases, the child unit 70 may not need separate microprocessors, and instead may only have a single microcontroller or ASIC to handle commands, instructions, or other information other than the content data. Indeed, either the image/audio processor 76 or the microprocessor 78 may be programmable to an extent to implement these other tasks involved in support of the capture, processing, and communication of the content data.

With continued reference to FIG. 2, the reception of the wireless transmission signal by a parent unit 84 is now described. As a general matter, the parent unit 84 is configured to receive the wireless signal to generate, or reproduce, the sounds and images captured by the child unit 70, as well as provide any commands, instructions, or other information via another wireless transmission signal. In this example, the wireless signal is received by an antenna or other apparatus (not shown) coupled to an RF transceiver 86, which may decode, demodulate and otherwise process the wireless signal to derive (e.g., reconstruct or generate) the transmitted information and data. To that end, the RF transceiver 86 may include a decoder or demodulator (not shown). In alternative cases, the decoding or demodulation operations are handled or integrated with other components of the parent unit 84 to any desired extent.

In the example shown, a microprocessor 88 is coupled to the transceiver 86 to receive the incoming data and information. While the transceiver 86 may demodulate the RF transmission, one or more initial processing operations, such as decompression, decoding, filtering, etc., are implemented by the microprocessor 88 to regenerate the transmitted data packets or data stream from the signal delivered by the transceiver 86. The microprocessor 88 may then parse the data packets or data stream to separate the content data from other information for separate processing. The microprocessor 88 may also process the content data into separate audio and image data streams. Either way, the microprocessor 88 in this example generally prepares the received data stream for further processing by an image/audio processor 90. In this example, the image/audio processor 90 includes a multimedia processor configured to process both the audio data and the image data. More generally, the image/audio processor 90 may then decode, decompress, and otherwise process the content data in accordance with one or more codecs, protocols, or other standards. In these ways, the image/audio processor 90 prepares and utilizes the image data for rendering or reproducing the images or visual content via a display 92, such as an LCD display. The processing of the audio data by the image/audio processor 90 may also include a digital-to-analog conversion. Alternatively, the image/audio processor 90 directs the audio data to a discrete digital-to-analog converter (not shown) after decoding and other processing to any desired extent. In these and other respects, the image/audio processor 90 may, but need not, be similar in form and functional capability to the image/audio processor 76 of the child unit 70, and may be integrated with the microprocessor 88 to any desired extent.

An analog waveform representative of the captured sounds is provided by the image/audio processor 90 to one or more speaker amplifiers 94. The operation of the amplifier 94 is controlled in this example by the image/audio processor 90, but alternative arrangements may involve or include control by the microprocessor 88. For example, the volume level and other operational settings of the amplifier 94 can be established via a control signal from the image/audio processor 90. In some cases, the microprocessor 88 may implement one or more routines configured to directly or indirectly establish these settings and control the audio reproduction more generally. The amplifier 94 provides an input signal at a desired amplitude level to one or more speakers 96 of the parent unit 84. In this way, the speaker amplifier 94 drives the output of the speaker 96 at a volume level selected for the reproduction of the captured sounds by the parent unit 84. To these ends, the microprocessor 88 may be responsive to one or more user switches or interface elements, as described below, to set or adjust the volume levels or for speaker activation and deactivation. In other examples, one or more programmable gain amplifiers (not shown) can be coupled to the user switches or interface elements to develop audio waveforms for the speaker amplifier 94 and/or the speaker 96 in accordance with the settings.

In accordance with one or more aspects of the disclosure, the parent unit 84 also includes a memory or storage device 98 in which content data can be stored. In some cases, the memory 98 is configured to retain the content data in a non-volatile manner, so that the storage of the content data in the parent unit 84 need not require uninterrupted power. One suitable type of non-volatile memory that may be used as the memory 98 includes or involves a removable flash memory card. Other types of memories well-suited to store audio, video, image or other content data in a non-volatile manner are also commercially available. For example, the memory 100 may alternatively or additionally provide non-volatile storage via a variety of different types of field-programmable arrays or other read-only, programmable devices (e.g., EEPROMs), which may be used for storing instructions or code to be implemented during the above-described operations. For these reasons, the memory 98 may differ from a memory 100 embedded within the microprocessor 88, which may store data and other information in a transient or volatile manner. The memories 98 and 100 may also differ in capacity, form, type, and other characteristics, insofar as the memory 98 is generally directed to non-transient storage of a selected portion of the content data. As described further below, an image, image set, or an audio/video sequence (including any number of image frames) may be selected by a user for storage in the memory 98.

Notwithstanding the foregoing, the memory 98 may vary considerably in form, type, and other characteristics. In this example, the memory 98 comprises flash memory. However, the memory 98 may include any type of solid-state memory architecture or other storage device type or medium. For example, the memory 98 may alternatively or additionally include magnetic media and a drive mechanism for data access and write operations. Still other suitable storage device types include optical media and drives.

Generally speaking, the memory 98 is communicatively coupled with the source(s) of the content data for non-volatile storage thereof. In this example, the child unit 70 (or any component or device thereof) may be considered a source of the content data. As described below, the memory 98 may be specifically directed to storing images (still or video) captured by the camera module 77 of the child unit 70. The transceiver 86, the microprocessor 88, and/or the image/audio processor 90 of the parent unit 84 may also be considered sources of the content data, regardless of whether the original source of the content data is in the child unit 70. In some cases, however, the original source of the content data may be the parent unit 84, as described below in connection with the example of FIG. 3.

In some cases, the memory 98 may provide considerable data storage capacity. As a result, the memory 98 may be considered a mass storage device, although the memory 98 is not limited to any particular capacity or capacity range. More generally, the memory 98 may include any number of storage elements or devices configured in any desired arrangement or architecture. In one example, the memory 98 includes a flash memory chip with a capacity in a range of 1-8 GB, such as the chips commercially available from Numonyx and SanDisk. The storage capacity of the parent unit 84 may be expanded via a removable flash memory drive or other device (not shown) coupled to a dedicated or universal input/output port of the parent unit 84.

In this case, the parent unit 84 has a Universal serial bus (USB) port 102 for communicating with another device, such as a personal computer. To that end, the USB port 102 is coupled to the microprocessor 88 for communication of content and other data. Thus, the USB port 102 may be used to access additional storage capacity or storage devices. In that way, the USB port 102 may be used when the storage of new or incoming content data may exceed the remaining storage capacity available on the parent unit 84, or as a backup for content data previously stored in the memory 98.

In accordance with one aspect of the disclosure, the USB port 102 and any other ports of the parent unit 84 are directed to distributing the stored content data and, more generally, providing export functionality for the parent unit 84. In this example, the content data received from the child unit 70 may be accessed or transferred from the parent unit 84 via the USB port 102. Once distributed, the content captured in the nursery or other monitoring location can be delivered from the child monitor system to another computer or device for viewing, etc., as desired. To these ends, the parent unit 84 may include one or more additional or alternative ports, such as card and other slots, to accept memory cards, cable connectors, and other devices configured in accordance with other data communication protocols or standards. Further details regarding the sharing, distribution or other delivery of captured content are set forth below in connection with the example of FIG. 4.

In accordance with another aspect of the disclosure, the parent unit 84 is generally configured to facilitate and control the selection of the captured content for storage. As described above, the storage may generally include or involve the memory 98 or any other memory or device via the USB port 102. Generally speaking, a user interface 104 of the parent unit 84 may be used by the caregiver to select the content for storage. The selection may generally involve or include the identification of a segment or other portion of the captured content. In the example shown in FIG. 2, the user interface 104 includes a keypad interface with a number of user selects, buttons, switches, and the like, configured to facilitate the identification or selection. To these ends, the user interface 104 may alternatively or additionally include any number of other input elements, including, for instance, a touch-sensitive portion of the display 92 or other touchscreen of any desired type (e.g., resistive, capacitive, acoustical, etc.). In these and other ways, the user interface 104 may be integrated to any desired extent with the display 92, including the control arrangement described in connection with the example shown in FIG. 1.

In operation, the above-described functionality of the parent unit 84 provides the caregiver with an opportunity to capture and store still and video images, as well as audio, remotely from the monitoring site. The remote nature of the content capture avoids disturbing the child while sleeping, or distracting the child during a play session, thereby maximizing the candid nature of the content. Remote content capture also increases the likelihood of obtaining desirable content. In one aspect, the functionality of the parent unit 84 generally provides the caregiver with a convenient ability to assess whether the content warrants storage. For example, the caregiver can make the assessment based on the reproduction of the image and audio content via the display 92 and the speaker 96. The portability of the parent unit 84 also allows the caregiver to make the assessment while engaged in another task or activity. As described below, the caregiver can then use the parent unit 84 to store and disseminate the selected content, all while monitoring the child remotely.

The child and parent units depicted in FIG. 2 may be configured to implement and provide remote content capture in a variety of ways. In one example, a caregiver or other user requests a still image, audio clip, or video sequence, by pressing one or more buttons of the user interface 104. The microprocessor 88 receives the request(s) and is configured to respond by storing content data in view of the request to the memory 98. The request may specify certain content (e.g., a particular still image) or a certain time frame or segment of content, or direct the microprocessor 88 to begin recording the content data arriving on the incoming data stream upon receipt of the request. Thus, the content capture may involve both contemporaneous or live content, as well as non-contemporaneous content (e.g., past or upcoming content). To these ends, the user interface 104 and the instruction set for the microprocessor 88 may be configured to provide and implement one or more of these options.

In some cases, commands or other information may also be transmitted from the parent unit 84 to the child unit 70 in response to a request. The commands and information may be communicated on a back channel or in time-multiplexed or other fashion so as not to interrupt the normal delivery of content data from the child unit 70. The commands may be generally directed to controlling the operation of the child unit 70 in view of the request. For example, the operation of the child unit 70 may be modified to capture higher resolution images, increase the image capture rate, increase the audio resolution, or otherwise modify the content collection to support an improvement in audio or image reproduction quality.

In one example, the child unit 70 is configured to capture audial and visual content in a varying manner to support higher resolutions as necessary or desired. The default operation of the child unit 70 may be generally directed to maximizing transmission range and battery life of the parent unit 84. To those ends, the child unit 70 may be configured to transmit at a minimum data rate sufficient for live video and audio playback until a request is received from the parent unit 84. Until that point, the caregiver may consider the reproduction of the content via the parent unit 84 acceptable. However, the minimum data rate may correspond with an image and audio reproduction resolution insufficient for permanent storage, subsequent distribution, or reproduction via devices other than the parent unit 84. Thus, when the caregiver requests image or audio content by pressing a button of the user interface 104, an instruction is sent to the child unit 70 to increase the data capture resolution. The child unit 70 may respond to the instruction by capturing or recording higher resolution data for a predetermined period of time, or for a time period specified in the instruction.

The child unit 70 may be configured to adjust one or more operational or transmission parameters to accommodate the transmission or storage of the content data. These adjustments may, for instance, be made during periods in which higher resolution content data is being recorded, transmitted, or otherwise processed. When transmitting the higher resolution data, a transmission parameter may be adjusted by the child unit in the interest of maintaining a desired transmission distance. Examples of operational or transmission parameters of the child unit 70 that may be adjusted include transmitting audio only, transmitting images only, transmitting audio and video at an increased RF output power level, or decreasing the video frame rate. One or more of these techniques may be applied automatically in response to a request from the caregiver, or may be selectively applied in accordance with one or more options or settings controlled via the user interface 104.

A variety of communication techniques may be utilized to support the two-way communication between the child unit 70 in the parent unit 84. In one example, a back channel is established with the primary communication link carrying the content data from the child unit 72 the parent unit 84. The back (or return) channel may, for instance, involve or incorporate one or more accommodations directed to avoiding any interruption in the transfer of content data. For example, instructions or messages from the parent unit 84 to the child unit 70 may be transmitted at a slower rate or via a different modulation scheme relative to the communication of the content data. In some cases, the back channel may also utilize a frequency offset from the frequency for the primary communication link. Alternatively, full-duplex communications may be supported via a dedicated transmit and receive radios, which would operate at different frequencies. Other cases may support two-way communications while minimizing manufacturing costs by taking advantage of how the child unit does not transmit continuously, such that the parent unit can send a transmission back occasionally in accordance with a time-division multiplexing scheme.

Figure 3:
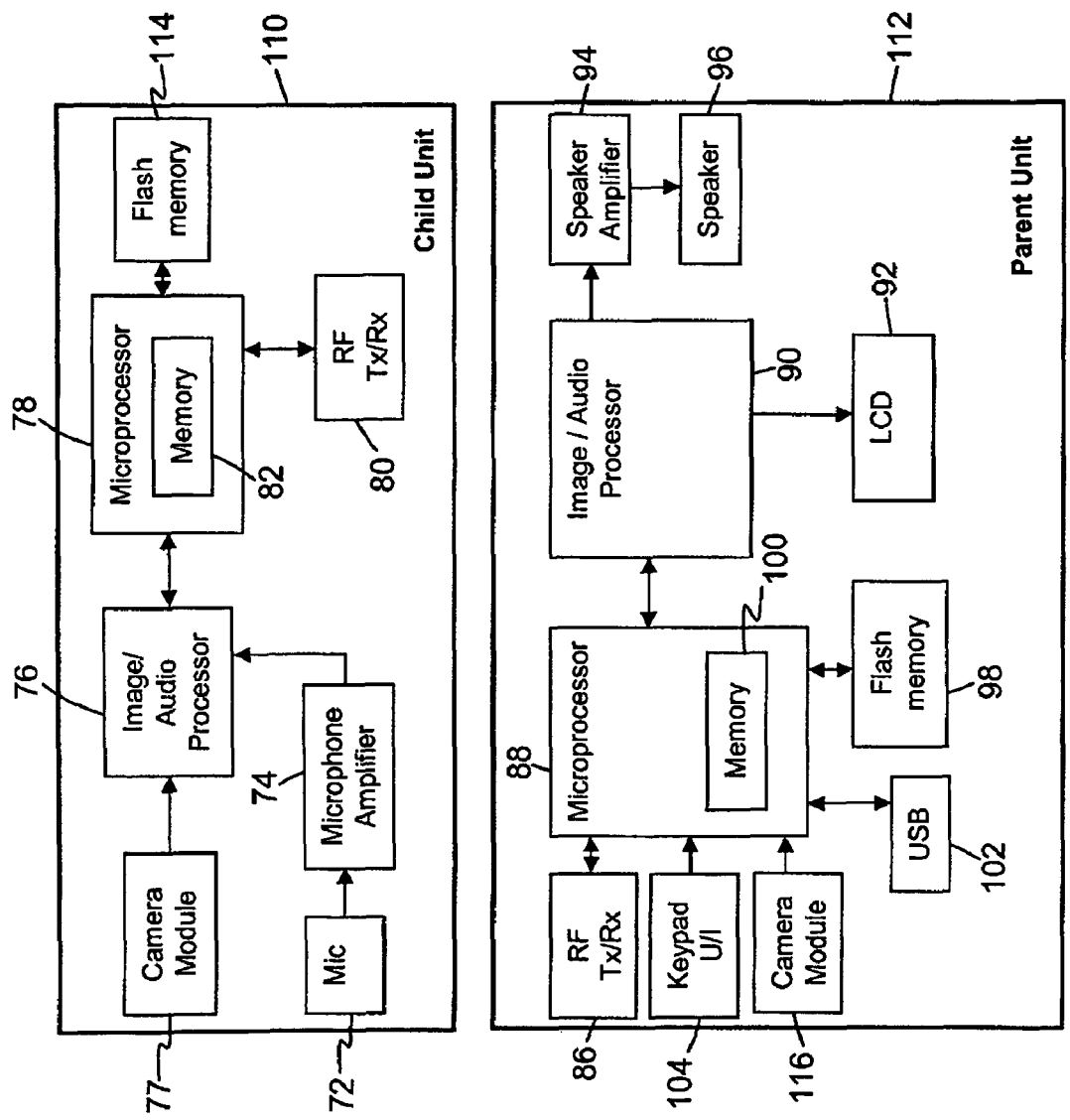
FIG. 3 is a schematic block diagram of another exemplary child monitor system in which both a child unit and a parent unit are configured to store content in accordance with several aspects of the disclosure.

Turning now to FIG. 3, where elements in common with other drawing figures are identified with like reference numerals, a child unit 110 and a parent unit 112 of an alternative child monitor system both have storage capability for capturing the desired content. In this example, the child unit 110 includes a memory 114, such as a flash memory, coupled to the microprocessor 78 in which content data captured via the microphone 72 or the camera module 77 can be stored. The storage operation may occur in parallel with the steps taken to transmit the content data via the transceiver 80. Alternatively or additionally, the storage operation may be implemented independently to any desired extent. In either case, the memory 114 is upstream of the wireless transmission, thereby avoiding any loss of data that can occur in a real-time wireless link. Such transmission losses can be tolerable as long as the resulting dropouts or distortions are limited to the live reproduction of the audio or video. However, higher quality audio and video is often expected and desired when the content data is reproduced later on a device other than the parent unit 112. Indeed, users may be much more discriminating of previously recorded and other non-live audio and video quality regardless of the playback device.

When the child unit 110 performs the data storage, a request or instruction may still be transmitted from the parent unit 112, as described above. For example, the instruction to record a still image, audio, or video sequence may be generated as a result of the caregiver pressing a button on the user interface 104 of the parent unit 112. The parent unit 112 then sends a corresponding message to the child unit 110, to which the microprocessor 78 of the child unit 110 responds to implement the data storage operation using the memory 114. The memory 114 receives the data without any loss of data over the wireless link. As a result, the child unit 110 can record the content data at any desired resolution and corresponding quality level. In some cases, the desired resolution and quality does not necessarily correspond with, and may, in fact, exceed, the resolution of the data transmitted to the parent unit 112 for live playback.

In this example, the content data stored in the memory 114 may be generally transferred from the child unit 110 at some point after the data storage operation. The data transfer may occur in a number of ways, both with and without the involvement of the parent unit 112. In some examples, the parent unit 112 requests that the child unit 110 transmit the stored data via the wireless link, such that the caregiver can review the data at the parent unit 112. Alternatively or additionally, the child unit 110 is instructed to transmit the stored data to another device other than the parent unit 112. In these cases, another wireless link or other communication path may be utilized. For instance, the child unit 110 may include one or more output ports or interfaces (not shown), such as a USB port, to couple the child unit 110 to the external device(s). To support the data transfer operation, the data stored in the child unit 110 can be reviewed by the caregiver on the display 92 of the parent unit 112, a similar display (not shown) on the child unit 110, or via any other desired device in communication with either the child unit 110 or the parent unit 112.

In some cases, and as shown in the example of FIG. 3, the parent unit 112 may include a camera module 116 for capturing further content. The camera module 116 may, but need not, be configured in the same or similar manner as the camera module 77 of the child unit 110. Generally speaking, the camera module 116 could utilize the display 92 and other components of the parent unit 112 to control, view or process the content data received from the child unit 110. Thus, for instance, the content data captured via the camera module 116 may also be recorded to the memory 98 of the parent unit 112. In these ways, the camera module 116 and, more generally, the parent unit 112, may act as a standalone digital camera.

In contrast to the examples described above, one or both of the memories 98, 114 may record content data without an explicit instruction to do so. In some cases, the child unit 110 or the parent unit 112 may be configured to store content data in the memories 98, 114 continuously, on a periodic basis, or on a scheduled basis. Storage may alternatively or additionally be triggered by an event or condition such that recording is implemented on an irregular or non-scheduled basis. For example, recording may be triggered automatically via motion or audio detection beyond a predetermined threshold level. In these and other cases, the memories 98, 114 may record the content data for a predetermined time period or until some user-specified or other condition is satisfied. For example, the recording may continue to a point defined by the remaining capacity of the memory 98, 114. Alternatively, the memories 98, 114 may be instructed by the microprocessors 76, 88 to overwrite some or all of the previously recorded data, as necessary. In these ways, and in other cases as desired, one or both of the memories 98, 114 (or any portion(s) thereof) may be configured as a buffer (e.g., a circular buffer), as further described below.

In accordance with one aspect of the disclosure, one or both of the memories 98, 114 may be configured as data buffers that selectively overwrite previously recorded content data based on whether a user request for data content storage has been made. Generally speaking, this aspect of the disclosure provides the caregiver with the capability of storing content data reflective of past content, e.g., content that has already been captured and transmitted. In this way, the caregiver can press a button to start recording after an event is observed, and have the past event captured automatically. In these cases, the content data is continuously stored in one or both of the memories 98, 114 in a loop of a user-specified or otherwise predetermined length. Overwriting then occurs (e.g., as a circular buffer) until the user requests audio or video storage by interacting with the user interface 104 of the parent unit 112 (e.g., pressing a button). Once the microprocessor 78, 88 receives the message, the microprocessor 78, 88 may temporarily stop recording the incoming content data to the memory 98, 114, or may redirect the incoming content data so that the previously recorded data is not overwritten. In some cases, the redirection involves a different portion of the memory 98, 114, a data cache (not shown), one of the embedded memories 82, 100, or any other available storage medium or device. More generally, the content data stored in the memory 98, 114 preceding the request is preserved as a result of the instruction or message to the microprocessor 78, 88 controlling the memory 98, 114 in which the content data is being stored. The amount of content (i.e., recording time) preserved by this technique may correspond with a predetermined time period (e.g., 15 seconds), or be determined as a user-specified parameter. Any number of data buffers, memories, or partitions located in the child unit 110, the parent unit 112, or both, may be used to implement the above-described technique as desired.

Figure 4:
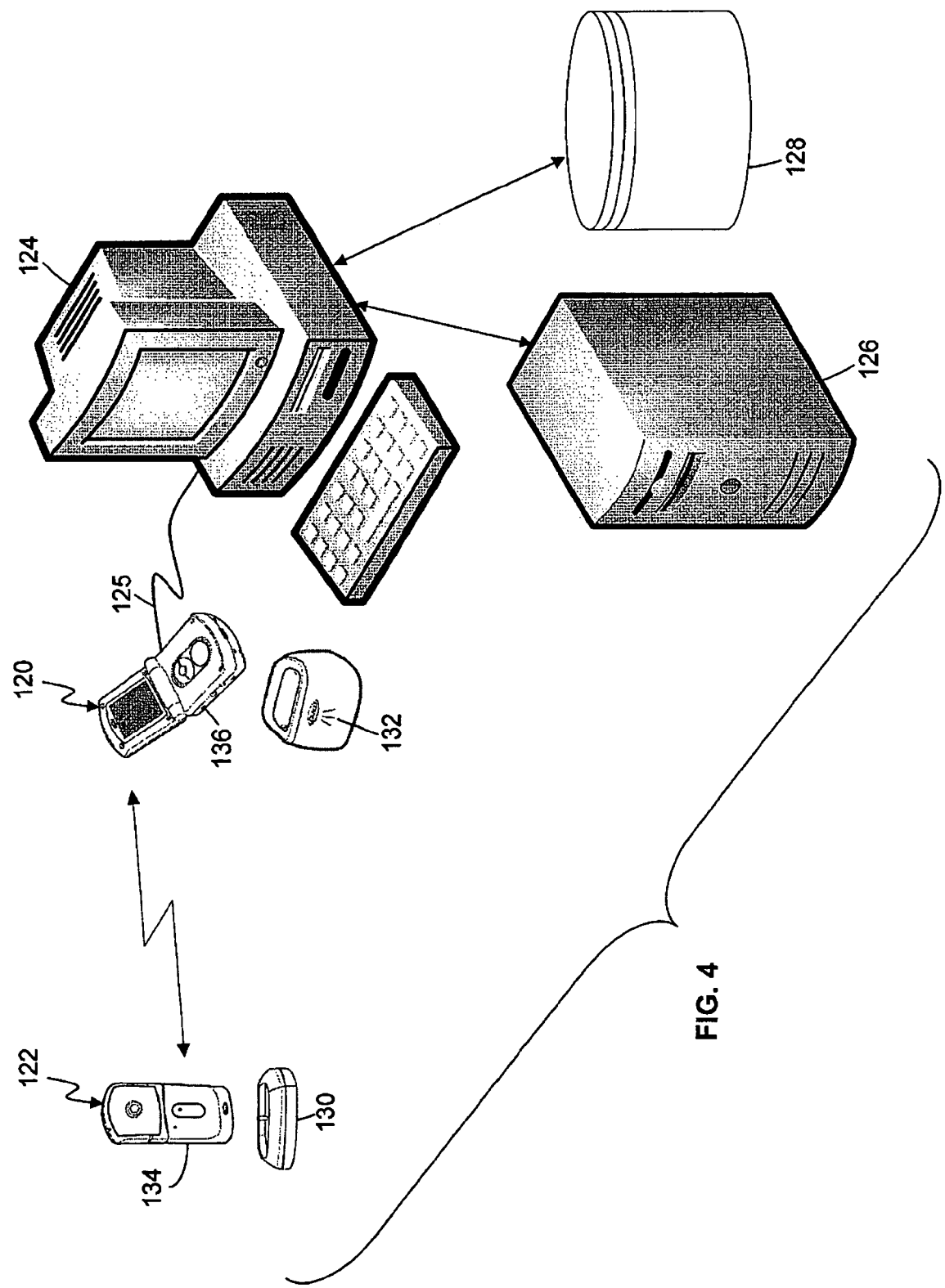
FIG. 4 is a schematic representation of another exemplary child monitor system configured to share stored content with one or more computers or other external storage devices in accordance with one or more aspects of the disclosure.

With reference now to FIG. 4, a parent unit 120 and a child unit 122 of a child monitoring system are integrated within a data network or other computing system for distribution of content data captured via the monitoring system. Generally speaking, the parent unit 120 is communicatively coupled to one or more computing devices to share the captured content data. In this example, the parent unit 120 is connected to a desktop computer 124 via a data cable 125, such as a USB cable. The desktop computer 124 is, in turn, communicatively coupled to a server or network computer 126 and a database 128 for further distribution of the content data. The desktop computer 124 may also be coupled either physically or communicatively with any number of peripheral devices, such as a printer.

Each of the communication connections within the system shown in FIG. 4 may involve any standard or conventional communication protocol as desired. In some cases, one or more of the communication connections includes or utilizes wireless signals, such as signals adhering to the IEEE 802.11 standard. For instance, the communication connection utilizing the data cable 125 may be replaced with a wireless communications link in alternative embodiments.

In operation, content data captured via either the parent unit 120 or the child unit 122 is passed from the parent unit 120 to the desktop computer 124 for viewing or other processing. From that point, the content data may be distributed in any desired manner throughout the network. Thus, the desktop computer 124, the server computer 126, or the database 128 may then be used to store a backup copy or other representation of the content data. In this way, one or more memories (not shown) of the desktop computer 124, the server computer 126, or the database 128 may provide alternative or additional remote mass storage capacity for the parent unit 120 and, more generally, for storage of the content data captured by the child monitoring system.

In this exemplary case, the child unit 122 includes a base station 130, and the parent unit 120 includes a base station 132. A handheld unit 134 of the child unit 122 cooperates with the base station 130 to form a connection used for power delivery or data communication. Similarly, a handheld unit 136 of the child unit 120 cooperates with the base station 132 to form another connection used for power delivery or data communication. In some cases, the base stations 130, 132 serve as a data communication interface with the desktop computer 124 or other computing devices. As a result, the connection interface between the base stations 130, 132 and the handheld units 134, 136 may include or support both power and data transfer. The power supplied via the base stations 130, 132 may be useful for charging perspective batteries of the handheld units 134, 136. While the base stations 130, 132 may provide a convenient mechanism for establishing and maintaining a communication connection with the computer 124, the base stations 130, 132 may be configured to provide a variety of other child monitoring functions. Further details regarding exemplary base station designs and the distribution of functionality between the base stations and the handheld units are set forth in co-pending and commonly assigned U.S. application Ser. No. 12/047,308, entitled "Baby Monitoring System with a Receiver Docking Station," and filed on Mar. 12, 2008, the entire disclosure of which is hereby incorporated by reference.

Notwithstanding the foregoing examples, the child unit 122 may be connected in any desired manner to the desktop computer 124 (or other computing device) to establish an additional or alternative communication path for storage of the content data. For example, child monitor systems constructed in accordance with the disclosure need not have a parent unit with non-volatile storage capability. Instead, the parent unit may act as a communication link or stage between the child unit and another computing device. In this way, the parent unit may only temporarily store the content data (e.g., in a volatile manner) before passing the content data to the computer 124.

Some child monitoring systems constructed in accordance with the disclosure are configured to support a one-way wireless communication link between the parent and child units. Although described above in connection with transceiver-based embodiments, practice of the disclosed techniques is not limited to two-way communications between the parent and child units. Thus, in some cases, the parent unit includes a receiver configured to receive a wireless communication signal generated by a transmitter of the child unit.

While a number of exemplary embodiments are described above to illustrate the control of content data capture and storage away from the nursery or other monitoring site, one or more aspects of the disclosed techniques may be alternatively, optionally, or additionally implemented at the child unit. For example, the child unit may include a display and/or a user interface for a caregiver to view the captured content and issue requests for storage, thereby providing an additional device or route for incorporation and utilization of the above-described functionality.

Although certain systems, devices and techniques have been described herein in accordance with the teachings of the present disclosure, the scope of coverage of this patent is not limited thereto. On the contrary, this patent covers all embodiments of the teachings of the disclosure that fairly fall within the scope of permissible equivalents.

What is claimed is:

1. A child monitor system, comprising:
a child unit comprising a sensor to capture content;
a portable parent unit comprising a processor, a display screen, and a user interface communicatively coupled with the processor to reproduce the content captured by the sensor on the display screen at a first resolution, wherein the child unit and the portable parent unit are configured to communicate via a wireless communication link carrying content data representative of the captured content at the first resolution; and
a memory communicatively coupled with the child unit or the parent unit and configured for non-volatile storage of the content data at a second resolution higher than the first resolution;
wherein the processor of the portable parent unit is configured to issue an instruction to effectuate the non-volatile storage of the content data at the second resolution in the memory in response to a content storage request received via the user interface.

2. The child monitor system of claim 1, wherein the content storage request identifies a past portion of the content data for the non-volatile storage.

3. The child monitor system of claim 1, wherein the memory comprises a circular buffer configured to continuously record the content data.

4. The child monitor system of claim 1, wherein the parent unit comprises the memory.

5. The child monitor system of claim 1, wherein the child unit is configured to transmit the content data for visual content at the first resolution for the parent unit to display the visual content and to transmit the content data for the visual content at the second resolution for the non-volatile storage of the content data.

6. The child monitor system of claim 1, wherein the child unit and the parent unit comprise respective transceivers to support the wireless communication link, such that the wireless communication link further carries commands from the processor of the parent unit to control the child unit.

7. The child monitor system of claim 6, wherein the child unit is configured to respond to the commands to modify a transmission parameter for the wireless communication link to facilitate the non-volatile storage of the content data.

8. The child monitor system of claim 6, wherein the child unit comprises the memory, and wherein the child unit is configured to respond to the commands to store the content data in the memory.

9. The child monitor system of claim 1, wherein the child unit is configured to respond to a command issued by the processor of the parent unit to increase a data capture resolution of the content captured by the sensor.

10. A method of recording content data via a child monitor system having a child unit and a portable parent unit, the method comprising the steps of:
receiving a wireless communication of data representative of content captured at a first resolution via a sensor of the child unit;
reproducing the captured content at the first resolution on a display screen of the portable parent unit;

issuing an instruction to store the data at a second resolution higher than the first resolution in a non-volatile memory in response to a user request received via the portable parent unit; and storing the data at the second resolution in the non-volatile memory.

11. The method of claim 10, wherein the user request identifies a past portion of the content data for storage in the non-volatile memory.

12. The method of claim 10, further comprising the step of continuously recording the data in a circular buffer of the non-volatile memory, such that the instruction issuing step comprises the step of preventing a portion of the data from being overwritten.

13. The method of claim 10, wherein the parent unit comprises the non-volatile memory.

14. The method of claim 10, further comprising the steps of:

transmitting the data for visual content at the first resolution to support the reproducing step; and transmitting the data for the visual content at the second resolution for storage in the non-volatile memory.

15. The method of claim 10, further comprising the step of increasing a data capture resolution of the content data via the sensor in response to a command issued by the portable parent unit.

* * * * *